M. GREBNER,

Assignor to MEYER & NEUBAUER.

Wire-Cage.

No. 8,594. Reissued Feb. 25, 1879.

Witnesses.

Chas. Wahlers.

William Miller.

Inventor.

Michael Grebner by his attys.

Van Santvoord & Hauff

N. PETERS, PHOTO-LITHOGRAPHER, WASHINGTON, D. C.

UNITED STATES PATENT OFFICE.

MICHAEL GREBNER, OF HOBOKEN, NEW JERSEY, ASSIGNOR TO MEYER & NEUBAUER, OF NEW YORK CITY.

IMPROVEMENT IN WIRE CAGES.

Specification forming part of Letters Patent No. 139,784, dated June 10, 1873; Reissue No. 8,594, dated February 25, 1879; application filed January 25, 1879.

*To all whom it may concern:*

Be it known that I, MICHAEL GREBNER, of Hoboken, in the county of Hudson and State of New Jersey, have invented a new and useful Improvement in Bird-Cages, which improvement is fully set forth in the following specification, reference being had to the accompanying drawings, in which—

Figure 1:
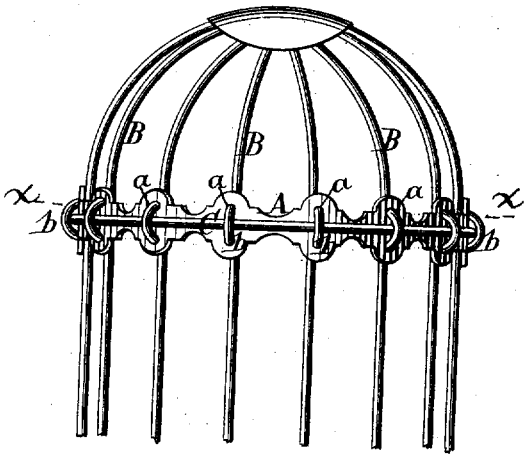
Figure 2:
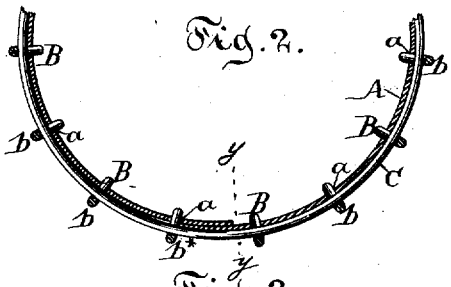
Figure 3:
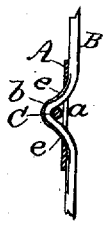

Figure 1 represents a front view. Fig. 2 is a horizontal section in the plane *x x*, Fig. 1. Fig. 3 is a section in the plane *y y*, Fig. 2.

Similar letters indicate corresponding parts.

This invention consists in the combination, in a bird-cage, of filling-wires provided with loops or crimps, and of cross-bands provided with holes adapted to engage with said loops or crimps, the sides of the loops or crimps of the filling-wires serving to prevent the vertical displacement of the cross-bands; also, in the combination, in a bird-cage, of filling-wires provided with loops or crimps, a cross-band adapted to engage with said loops or crimps, and a key for locking the cross-band on the loops or crimps.

In the manufacture of bird-cages it is very desirable to produce a strong and durable connection between the filling-wires and the cross-bands without the use of solder; and in order to accomplish this purpose the cross-bands have been made of strong wires provided with transverse holes for the passage of filling-wires, which, after having been passed through the cross-bands, are fastened by compressing said cross-bands at the places where they have been perforated. This arrangement is of undoubted advantage; but its execution requires either great skill or perfect and expensive machinery.

By my invention the same object is effected in a simple and economical manner.

In the drawings, the letter A designates one of the cross-bands of my bird-cage. This cross-band is stamped or otherwise produced of sheet metal or any other suitable material, and it is provided with a series of holes, *a*, preferably at uniform distances apart. These holes are intended to engage with the filling-wires B; and in order to effect this purpose the filling-wires are provided with loops or crimps *b*, which fit the holes *a*, and which, when passed through said holes, effectually prevent the vertical displacement of the cross-band.

By referring to Fig. 3 it will be seen that by means of said crimps in the filling-wires bearing-surfaces *e e* are formed, which, when the crimps are passed through the holes *a*, abut against the edges of these holes above and below; and since, when the cage is finished, the cross-bands are drawn tight up against the plain or uncrimped portions of the filling-wires, the crimps *b*, when passed through the holes *a*, prevent the cross-bands from being displaced; and since the filling-wires are fastened at the top and bottom of the cage, a displacement could be effected only by pressing the filling-wires inward, so as to disengage their crimps from the holes in the cross-bands, or by disconnecting the ends of said cross-bands.

In order to produce a permanent connection between the filling-wires and the cross-bands, and to prevent either of the filling-wires from being pressed in, so as to disengage its crimps from the cross-bands, I employ a locking bar or key, C, which is passed through the crimps of the filling-wires on the outside of each cross-band, as shown in Figs. 1 and 2. The ends of each cross-band are made to overlap each other, and one of the crimps, *b**, Fig. 2, is passed through two holes near the opposite ends of the cross-band, so that when the locking bar or key is passed through the crimps the ends of the cross-band are firmly retained in position without solder.

The ends of the locking-bar C are cut off, so that the same will meet closely on the circumference of the cross-band, and by slight blows upon the crimps of the filling-wires next to the ends of the locking-bar said ends are prevented from slipping back, and a firm connection between the cross-bands, the filling-wires, and the locking-bar is effected without the use of solder. If desired, however, the ends of the locking-bar might be secured in position by solder. The cross-bands might also be made in sections, and in this case the locking-bar would have to be clamped in each of the crimps of the filling-wires.

The cross-bands for my cage, together with their holes, can be readily stamped out with any ordinary press, and the crimps in the filling-wires can be produced expeditiously by means of simple tools prepared for this purpose, so that I can construct my cage in an economical manner; and since no solder is required in the construction of my cage, I can expose the same to sufficient heat for enameling, if such is desired.

It is obvious that this invention is applicable to cages for squirrels or other animals besides birds.

What I claim as new, and desire to secure by Letters Patent, is—

1. The combination, in a bird-cage, of filling-wires provided with loops or crimps, and of cross-bands provided with holes adapted to engage with said loops or crimps, to prevent the vertical displacement of the cross-bands, substantially as set forth.

2. The combination, in a bird-cage, of filling-wires provided with loops or crimps, a cross-band adapted to engage with said loops or crimps, and a key for locking the cross-band on the loops or crimps, substantially as and for the purpose shown and described.

In testimony that I claim the foregoing I have hereunto set my hand and seal this 23d day of January, 1879.

M. GREBNER. [L. S.]

Witnesses:
W. HAUFF,
E. F. KASTENHUBER.